3,728,139
DURABLE BOROSILICATE OPAL GLASSES
Gerald B. Carrier and James E. Flannery, Corning, N.Y., assignors to Corning Glass Works, Corning, N.Y.
Filed Dec. 3, 1970, Ser. No. 94,834
Int. Cl. C03c 3/08, 3/22, 3/30
U.S. Cl. 106—54                  3 Claims

ABSTRACT OF THE DISCLOSURE

The present invention relates to borosilicate opal glasses containing a discontinuous opal phase which exhibit improved chemical durability as well as low thermal expansivity. These glasses preferably consist essentially, in weight percent on the oxide basis as calculated from the batch, of 72–76% $SiO_2$, 9–14% $B_2O_3$, 1–6% of alkali metal oxides, 0.5–2.0% of bivalent metal oxides, 0.5–2.0% $TiO_2$, 0–0.5% $ZrO_2$, 0–1.5% $Al_2O_3$, and 1–2% of oxides selected from the group consisting of $MoO_3$, $WO_3$, and $As_2O_3$.

BACKGROUND OF THE INVENTION

Figure 1:
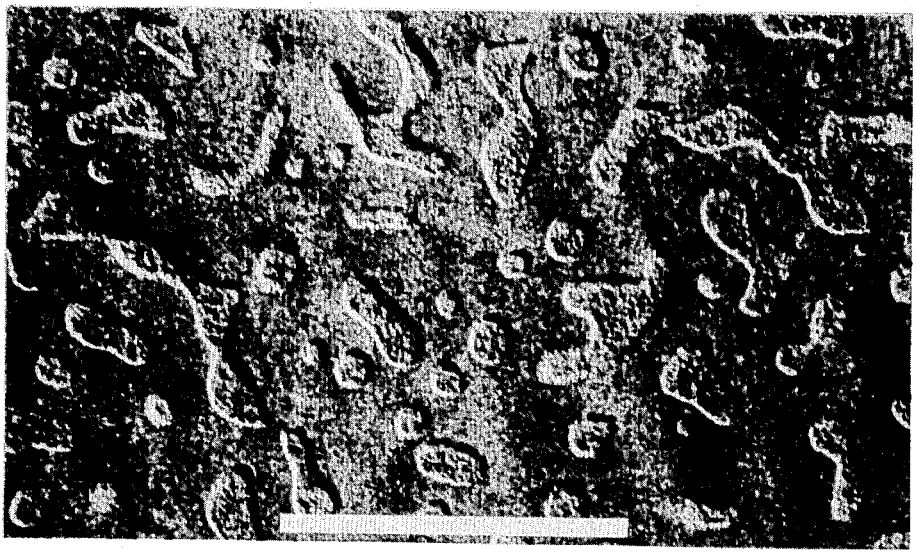

Opal glasses are generally light-diffusing glasses ranging in appearance from near-transparent to opaque. The opacity demonstrated by such glasses is generally the result of a phase separation wherein a light-diffusing phase is evenly separated throughout a transparent glassy matrix, the light-diffusing phase having an index of refraction differing from that of the matrix glass so as to cause light scattering and thus loss of transparency in the glass. The opacifying phase may be either crystalline or amorphous, and either continuous or particulate. Factors affecting the degree of opacity or density of the opal glass include the relative refractive indices of the opacifying phase and matrix glass, as well as the size, shape, number, and distribution of the particles making up the opacifying phase.

The manufacture of opal glasses contemplates the inclusion in the glass batch of a so-called opalizing agent which will form a compound which is soluble in the glass melt but which is phase-separable therefrom upon cooling the glass or upon further heat treatment. Opalizing agents suitable for producing opal glassware from conventional soda-lime glasses are well known and include metal chloride, fluoride, sulfate, and phosphate salts; however, the resulting glassware demonstrates the customary relatively high thermal expansivity of soda-lime glasses, having coefficients of thermal expansion as high as $90 \times 10^{-7}/°$ C. as averaged over the range from about 20°–300° C. Because of this rather high thermal expansivity, such glassware does not have adequate thermal shock resistance to permit use, for example, as ovenware. Consequently, borosilicate-type glasses having average coefficients of thermal expansion in the range from about 25 to $50 \times 10^{-7}/°$ C., which exhibit greatly improved thermal shock resistance, are customarily employed in manufacturing glassware to be used in high temperature or thermal cycling applications.

Opal glasses of the borosilicate type described above are well known. U.S. Pat. No. 3,275,492, for example, describes some of these borosilicate glasses, and a method of manufacturing them, which can be used to produce opal glassware having good thermal shock resistance within a broad range of opal densities. Such glasses generally contain an opalizing agent selected from the group consisting of ZnO, MgO, CaO, BaO, NiO, CoO, MnO, and CuO, as well as an optional secondary chloride or sulfate opalizing agent, and possess good working properties for conventional melting and forming operations. However, it has been found that these opals exhibit somewhat less than optimum chemical durability in contact with certain solutions. One cause of such low durability is thought to be the continuity of the separated opal phase, which is generally more susceptible to chemical attack than the surrounding borosilicate glass matrix. If the separated phase is highly soluble in the attacking medium, continuity within this phase gives leaching paths which allow the medium to penetrate deeply into the glass. Such poor durability can be a problem, for example, in ovenware, where deep penetration by food or detergent solutions at elevated temperatures may cause discoloration or staining. If, however, the separated or soluble phase were not continuous, but rather in the form of separate droplets with little or no interconnection, the attacking medium could only leach those droplets near the surface, and deep penetration due to chemical attack could be avoided.

BRIEF SUMMARY OF THE INVENTION

We have discovered an area of glass composition wherein opal borosilicate glasses may be produced which exhibit greatly improved chemical durability, low thermal expansivity, and a broad range of opacities varying from near-transparent to dense white. The improved chemical durability of these glasses is the result of a very finely-divided, highly-discontinuous, opacifying phase evenly dispersed throughout the base glass matrix, which is effective to prevent deep penetration into the glass by leaching solutions, and thus staining or discoloration of the glass. We have found that such a highly discontinuous opacifying phase may be obtained through the incorporation into the glass batch of minor amounts of at least one metal oxide selected from the group consisting of $MoO_3$, $WO_3$, and $As_2O_3$. We have also found that these oxide additions are effective in improving chemical durability over a fairly broad range of borosilicate opal glass compositions.

Figure 2:
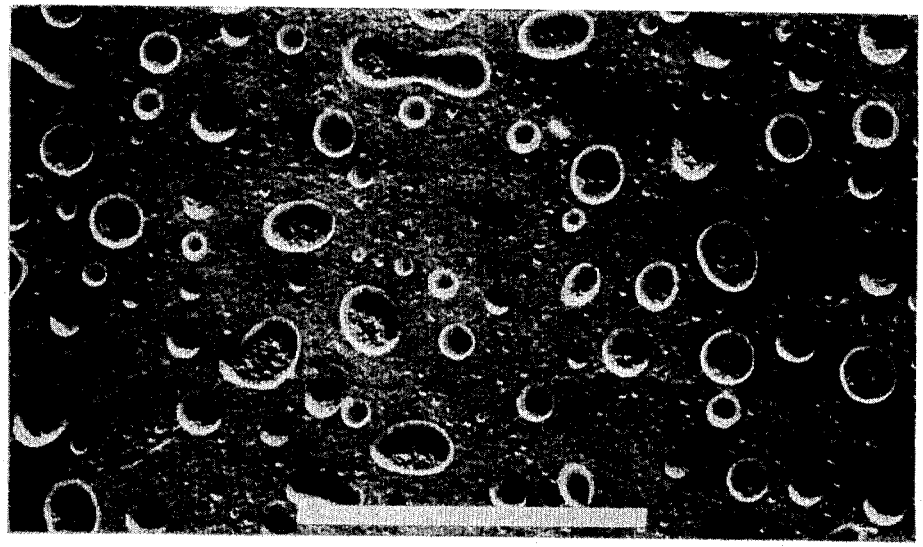

The invention may be further understood by reference to the following detailed description thereof, and to the appended drawing, wherein FIG. 1 is an electron micrograph of a cross-section of a conventional borosilicate opal glass in which the opacifying phase appears as a series of interconnecting irregularly-shaped droplets scattered throughout the cross-section, and wherein FIG. 2 is an electron micrograph of a cross-section of a borosilicate opal glass according to the present invention in which the opacifying phase appears as a number of small, disconnected droplets, predominantly spherical in shape.

DESCRIPTION OF THE PREFERRED EMBODIMENTS

Opal borosilicate base glasses which may be successfully treated according to the invention consist essentially, in weight percent on the oxide basis as calculated from the batch, of about 70–80% $SiO_2$, 8–15% $B_2O_3$, 0–10% of alkali metal oxides selected from the group consisting of $Na_2O$, $Li_2O$, and $K_2O$, 0–15% of bivalent metal oxides selected from the group consisting of ZnO, MgO, CaO, BaO, NiO, CoO, MnO, and CuO, 0–5% of oxides selected from the group consisting of $TiO_2$ and $ZrO_2$, and 0–3% $Al_2O_3$. In addition, up to about 3% by weight of conventional glass colorants such as $Cr_2O_3$, $V_2O_5$, and $MnO_2$ may be present if desired.

The essential constituent for the purpose of improving the chemical durability of opal borosilicate base glasses of the type described above has been found to be an oxide or combination of oxides selected from the group consisting of $MoO_3$, $WO_3$, and $As_2O_3$. These oxides should be present in amounts totalling at least about 0.2% by weight of the batch and preferably between about 1–2% by weight of the batch. Amounts in excess of 3% by weight do not appear to be helpful in improving the chemical durability of the resultant glass and in addition add considerably to the cost of the batch. The exact mechanism by which these oxides operate to produce a highly discontinuous opacifying phase with resulting improvements in chemical durability is not definitely known, but at present it is believed that they affect the surface tensions of the matrix glass and/or the opacifying phase in such a way as to promote the formation of the opacifying phase in the form of small discontinuous droplets.

Among the glasses which are preferred according to the present invention are those consisting essentially, in weight percent on the oxide basis as calculated from the batch, of about 72–76% $SiO_2$, 9–14% $B_2O_3$, a total of 1–6% of alkali metal oxides selected from the group consisting of $Na_2O$, $K_2O$, and $Li_2O$, a total of 3–9% of bivalent metal oxides selected from the group consisting of ZnO, MgO, and CaO, 0–1.5% $Al_2O_3$, 0–0.5% $ZrO_2$, 0.5–2.0% $TiO_2$, and a total of 1–2% oxides selected from the group consisting of $MoO_3$, $WO_3$, and $As_2O_3$. These glasses are preferred for many applications, and particularly for commercial ovenware, because they combine good chemical durability with excellent thermal shock resistance and uniform dense white opacity. Table I contains examples of several specific opal borosilicate glass compositions of the invention, as calculated in weight percent on the oxide basis from the glass batch, together with various physical properties of those glasses which were determined according to conventional and well known procedures. Thermal expansions ($\times 10^{-7}/°$ C.) are reported as measured over the temperature range of 20°–300° C.

Generally, these glasses are clear or slightly hazy upon being cooled from the melt and may be opacified by heating at a temperature in the range from about 700°–780° C. for between about 4 minutes to 1 hour. The opacifying process is both time and temperature dependent, so that at lower temperatures longer heating times will be required to obtain a given degree of opacity. For compositions higher in $Li_2O$, opalization is more rapid, so that with glasses containing 3–6% $Li_2O$ by weight, opacity may strike in spontaneously as the glass is cooled from the melt. However, these glasses exhibit the same phase separation characteristics as the other glasses of the invention.

The effect of the additions of $MoO_3$, $WO_3$, and/or $As_2O_3$ on the physical distribution of the opacifying phase was determined by an electron micrograph study comparing prior art borosilicate opals with the glasses of the invention. A glass of the composition of Example 1 of Table I, chosen as representative of the glasses of the invention, was compared with a glass of exactly the same base composition, but containing no arsenic, molybdenum, or tungsten oxide additions. The results are graphically shown in the drawing, wherein FIG. 1 is the micrograph of the prior art borosilicate opal glass and FIG. 2 illustrates the same glass with the addition of 2% by weight of $MoO_3$. The white bar represents one micron in both cases. From a study of these micrographs it is evident that the opacifying phase of the glass of the invention is substantially less continuous than that of the prior art glass, and in addition is of noticeably greater uniformity. It is this highly discontinuous opacifying phase which is believed to result in the improved chemical durability of these opal borosilicate glasses.

The actual durability of treated borosilicate opals as compared with prior art opals was determined by subjecting the glasses to strong detergent solutions at elevated temperatures in accordance with well-known procedures. Specifically, our procedure comprises preparing a water solution containing 0.3% by weight of Super Soilax® brand detergent, a commercially available product, and immersing the glasses to be tested in that solution while maintaining it at a temperature of 95° C.

TABLE I

| | 1 | 2 | 3 | 4 | 5 | 6 | 7 | 8 | 9 |
|---|---|---|---|---|---|---|---|---|---|
| $SiO_2$ | 74.83 | 77.45 | 74.96 | 74.56 | 74.30 | 74.30 | 72.00 | 73.20 | 72.40 |
| $B_2O_3$ | 12.60 | 9.07 | 10.13 | 12.71 | 11.80 | 11.80 | 10.30 | 11.30 | 12.70 |
| ZnO | 8.63 | 8.82 | 8.76 | 8.71 | 8.70 | 8.20 | 8.60 | 8.80 | 8.70 |
| $TiO_2$ | 0.76 | 0.78 | 0.77 | 0.77 | 0.77 | 0.77 | | 0.80 | 3.33 |
| $Al_2O_3$ | 0.05 | | | 0.05 | 1.23 | 1.63 | 1.67 | | |
| $ZrO_2$ | 0.08 | | | 0.08 | 0.08 | 0.08 | | | |
| $Li_2O$ | | 2.48 | 2.46 | 1.96 | 1.96 | 1.96 | .078 | 2.47 | 1.96 |
| $Na_2O$ | 3.05 | | | | | | 5.00 | 2.01 | |
| $K_2O$ | | | 1.52 | | | | | | |
| $MoO_1$ | 2.00 | 1.41 | 1.40 | 1.16 | 1.15 | 1.15 | 1.60 | 1.04 | 1.40 |
| Annealing point, ° C | 622 | 682 | 663 | 658 | 621 | 590 | 567 | 603 | 634 |
| Strain point, ° C | 592 | 599 | 579 | 598 | 571 | 549 | 537 | 568 | 581 |
| Thermal expansion | 30.0 | 29.6 | 31.7 | 29.6 | 29.2 | 28.8 | 41.0 | 38.2 | 30.6 |
| Density, grams/cc | 2.330 | 2.330 | 2.340 | 2.313 | 2.335 | 2.326 | 2.400 | 2.377 | 2.338 |

Glasses within the preferred range of compositions may generally be melted and formed according to conventional and well-known glass-working techniques. Thus, they may be melted in a gas-fired continuous glass melting unit at temperatures between about 1450°–1600° C., the particular melting conditions for any given glass being determined from its physical properties in the usual manner. Batch ingredients may also be of conventional nature, as indicated in Table II below which lists the batch ingredients used to make the glass of Example 1 of Table I.

TABLE II

Supersil® 200 mesh sand
Boric acid
Zinc oxide
Titanium dioxide
A-1 calcined alumina
Zirconium silicate
Molybdenum trioxide
Sodium carbonate Every two hours the glasses are removed from the solution, dried, coated with DY–CHEK™ dye, a commercially available penetrating organic liquid, and permitted to stand for 5 minutes to allow the dye to penetrate.

Then the dye is removed, with the glasses being graded according to the difficulty of removal. If after standing, the dye can be completely removed with a dry cloth, the glass is graded AA, with a wet cloth, class A, with a detergent solution, class B, with cleansing powder, class C, and if not removable, class F. All of the examples of Table I were at least class B after 16 hours of detergent treatment, and some of the glasses of the invention are AA even after 24 hours of treatment, whereas without any $MoO_3$, $As_2O_3$, or $WO_3$ oxide additions, some compositions fail in 2–8 hours. Table III compares certain representative glasses of the invention with some prior art borosilicate opals containing no $MoO_3$, $As_2O_3$, or $WO_3$ additions as to stain-resistance after 16 hours of immersion in the abovedescribed detergent solution at 95° C.

TABLE III

| | 1 | 2 | 3 | 4 | 5 | 6 |
|---|---|---|---|---|---|---|
| $SiO_2$ | 74.83 | 77.45 | 74.96 | 72.86 | 74.83 | 77.85 |
| $B_2O_3$ | 12.60 | 9.07 | 10.13 | 12.34 | 12.60 | 9.23 |
| ZnO | 8.63 | 8.82 | 8.76 | 8.46 | 8.63 | 8.98 |
| MgO | | | | | | 0.67 |
| $TiO_2$ | 0.76 | 0.78 | 0.77 | 0.75 | 0.76 | 0.79 |
| $ZrO_2$ | 0.08 | | | 0.08 | 0.08 | |
| $Al_2O_3$ | 0.05 | | | 0.84 | 0.05 | |
| $Li_2O$ | | 2.48 | 2.46 | | | 2.48 |
| $Na_2O$ | 3.05 | | | 2.99 | 3.05 | |
| $K_2O$ | | | 1.52 | | | |
| $MoO_3$ | 2.0 | 1.41 | 1.40 | 1.68 | | |
| Stain resistance (16 hours) | A | B | B | AA | F | F |

From a study of the above data, it is apparent that the glasses of the invention, containing the prescribed $MoO_3$ additions, exhibit greatly improved stain resistance in comparison with prior art glasses subjected to the same rigorous detergent conditions.

We claim:

1. A composition for a borosilicate opal glass of improved chemical durability consisting essentially, in weight percent on the oxide basis as calculated from the batch, of about 72–76% $SiO_2$, 9–14% $B_2O_3$, 0–1.5% $Al_2O_3$, a total of 1–6% of alkali metal oxides selected from the group consisting of $Li_2O$, $K_2O$, and $Na_2O$, a total of 3–9% of bivalent metal oxides selected from the group consisting of ZnO, MgO, and CaO, 0–0.5% $ZrO_2$, 0.5–2.0% $TiO_2$, and a total of at least 1% of oxides selected from the group consisting of $MoO_3$, $WO_3$, and $As_2O_3$.

2. A composition according to claim 1 wherein the total of oxides selected from the group consisting of $MoO_3$, $WO_3$, and $As_2O_3$ does not exceed about 3% by weight of the batch.

3. A composition according to claim 1 wherein the total of oxides selected from the group consisting of $MoO_3$, $WO_3$, and $As_2O_3$ ranges between about 1–2% by weight of the batch.

References Cited

UNITED STATES PATENTS

| 3,275,492 | 9/1966 | Herbert | 106—54 X |
| 3,238,085 | 3/1966 | Hayami et al. | 65—33 X |
| 3,413,133 | 11/1968 | Stalego | 106—54 X |
| 2,570,020 | 10/1951 | Armistead | 106—54 X |
| 1,676,331 | 7/1928 | Hochstein | 106—54 |

FOREIGN PATENTS

| 874,936 | 8/1961 | Great Britain | 106—39 DV |

OTHER REFERENCES

Arsenic Oxide, in Ceramic Industry Magazine, Chicago, 1967, p. 69 (TP785C411).

WINSTON A. DOUGLAS, Primary Examiner

M. L. BELL, Assistant Examiner

U.S. Cl. X.R.

106—39 DV